United States Patent [19]

Johnston et al.

[11] Patent Number: 4,749,433

[45] Date of Patent: Jun. 7, 1988

[54] METHOD OF LAYING CARPET TO AVOID SEAM PEAKING AND APPARATUS THEREFOR

[76] Inventors: Wayne R. Johnston, 1114 Harwich Dr., San Marcos, Calif. 92069; Alan G. Johnston, 8 Spencer Dr., Nashua, N.H. 03062

[21] Appl. No.: 819,804

[22] Filed: Jan. 16, 1986

[51] Int. Cl.[4] .................. B32B 31/08; B32B 31/20
[52] U.S. Cl. .................. 156/304.4; 156/304.6; 156/304.7; 156/309.9
[58] Field of Search ............... 156/304.3, 304.4, 304.6, 156/304.7, 554, 182, 309.9

[56] References Cited

U.S. PATENT DOCUMENTS

| | | | |
|---|---|---|---|
| 1,917,430 | 7/1933 | Clark | 156/304.4 |
| 3,127,303 | 3/1964 | Neuhauser et al. | 156/304.3 |
| 3,523,176 | 8/1970 | Hill | 219/245 |
| 3,533,876 | 10/1970 | Burgess | 156/304.4 |
| 3,582,436 | 6/1971 | Bucher | 156/502 |
| 3,651,305 | 3/1972 | Shimota | 219/243 |
| 3,917,922 | 11/1975 | Kirsch | 219/243 |
| 3,927,298 | 12/1975 | Prater | 219/245 |
| 3,969,564 | 7/1976 | Carder | 156/304.4 |
| 3,972,768 | 8/1976 | Hill | 156/545 |
| 4,438,323 | 3/1984 | Milnes | 219/243 |

OTHER PUBLICATIONS

Weeks et al., "Rugs and Carpets of Europe and the Western World," pp. 183–190 (1969).

Primary Examiner—Michael G. Wityshyn
Attorney, Agent, or Firm—Baker, Maxham & Jester

[57] ABSTRACT

A method of laying carpet to avoid seam peaking, the method employing an enhanced width seaming tape spanning the butting edges of the carpet forming the seam. The tape has a hot melt adhesive on the upper surface facing the carpet backing. An enhanced width carpet seaming iron is employed to melt the adhesive and to provide a bond between the tape and the carpet backing. In an alternative embodiment, the tape is made in three segments with one of them applied spanning the seam and the other two in flanking positions along either side of the seam spanning tape. The invention also includes several embodiments of the enhanced width seaming iron for application of the tape to the carpet seam.

2 Claims, 5 Drawing Sheets

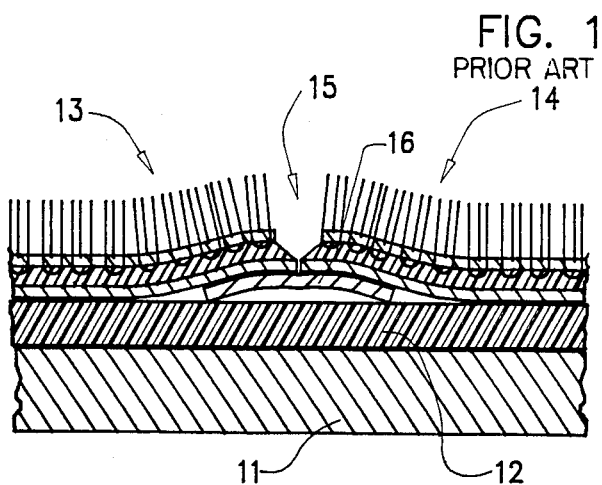
FIG. 1 PRIOR ART
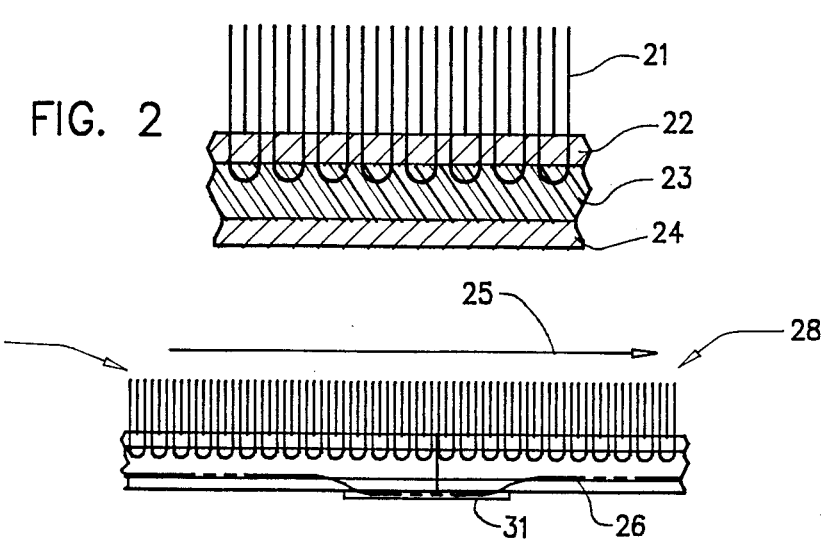
FIG. 2
FIG. 3
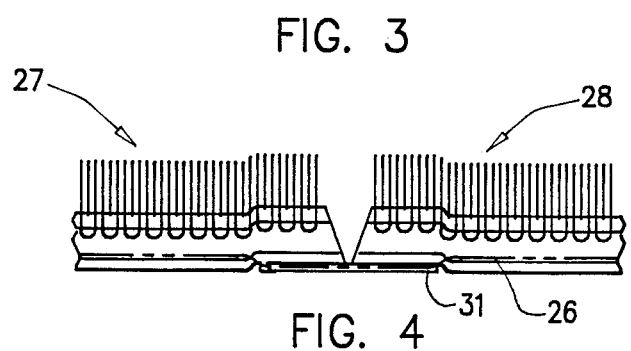
FIG. 4

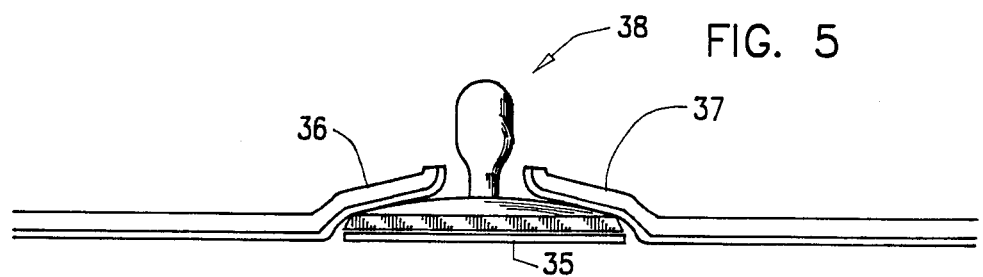
FIG. 5
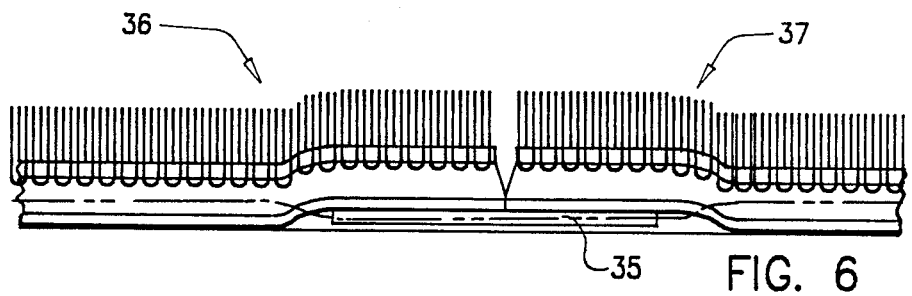
FIG. 6
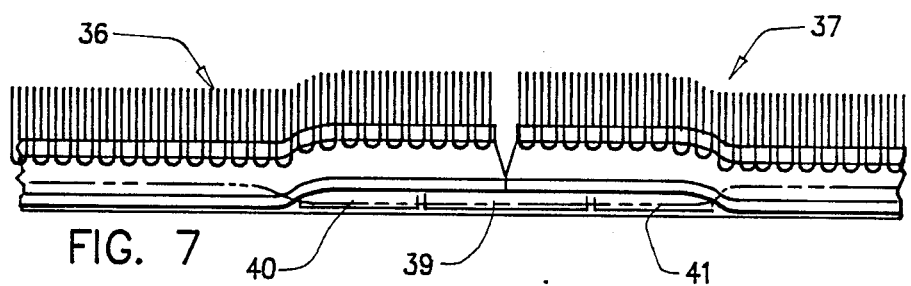
FIG. 7
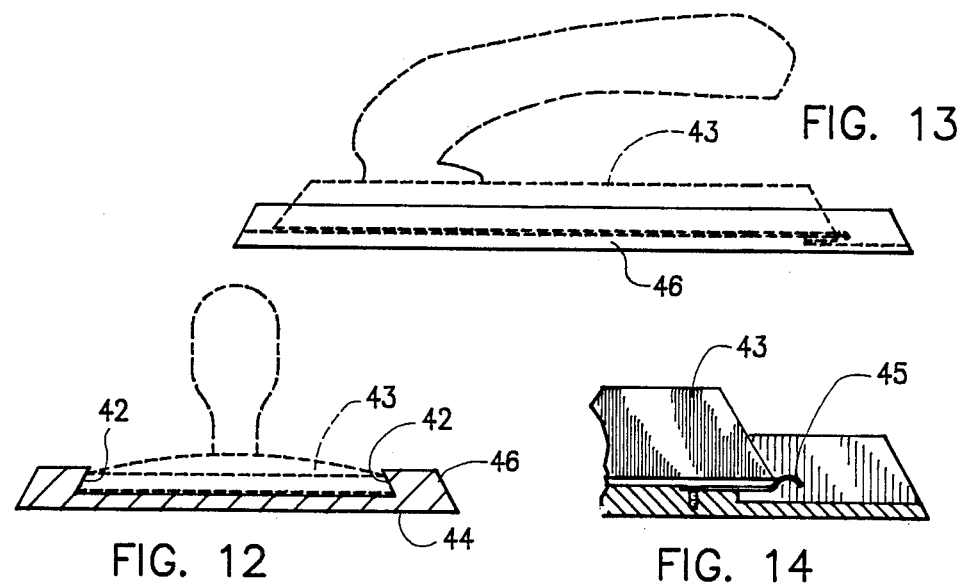
FIG. 13
FIG. 12
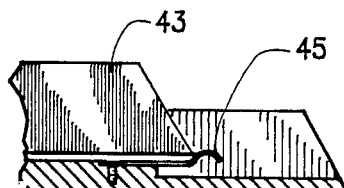
FIG. 14

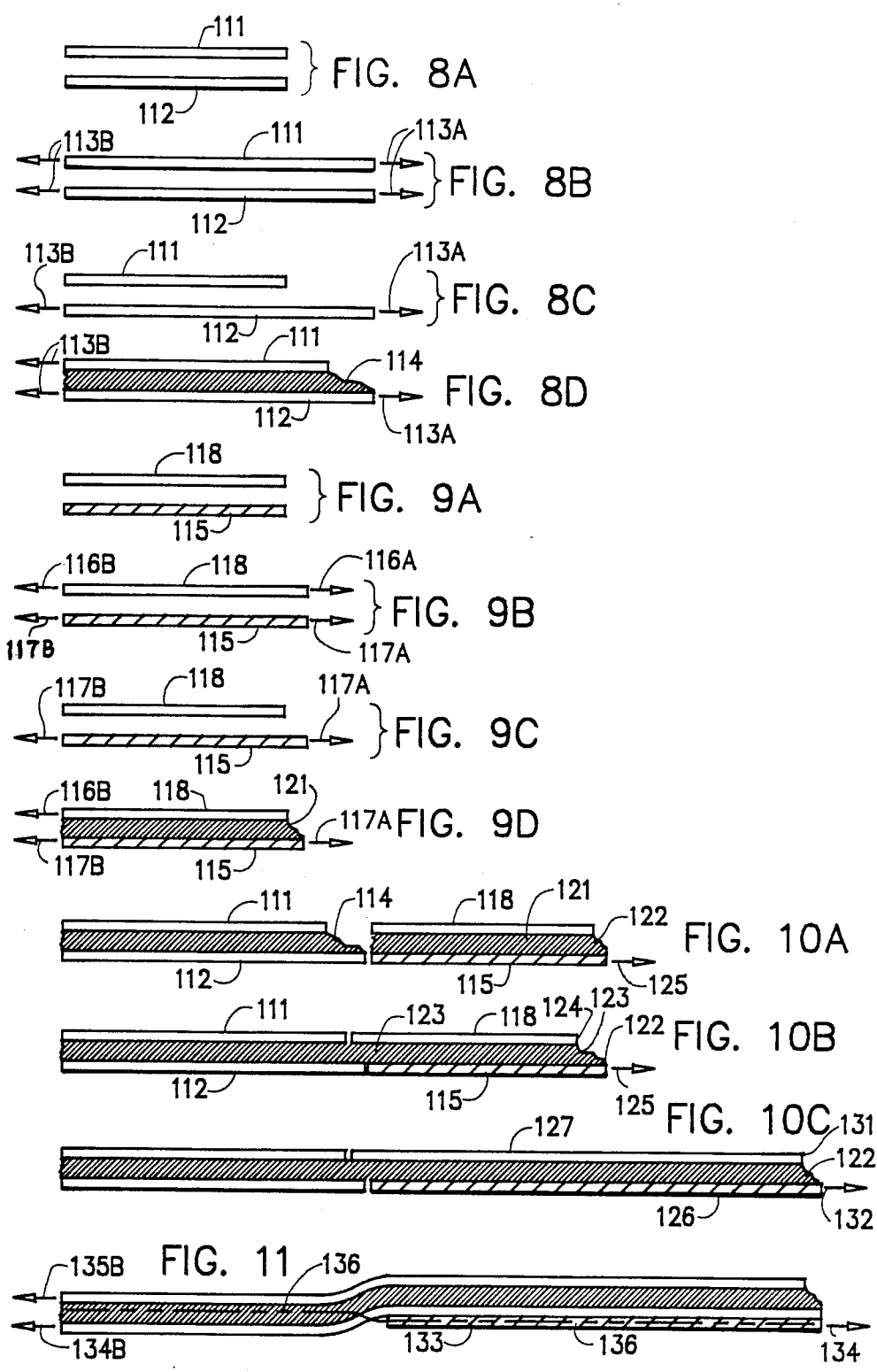

METHOD OF LAYING CARPET TO AVOID SEAM PEAKING AND APPARATUS THEREFOR

FIELD OF THE INVENTION

This invention relates generally to carpet seaming and more particularly to a method and apparatus for laying carpet with seams so as to reduce seam peaking.

DISCUSSION OF THE PRIOR ART

It is well known to join two pieces of carpet over conventional padding, by means of a heat-activated adhesive tape disposed along the seam. Carpet seaming tape has disposed on its upper surface hot melt adhesive material which melts when heat is applied. While the adhesive still is in the molten state, two pieces of carpet can be joined along the tape to create a seam. The hot adhesive cools and hardens very quickly.

The means which has commonly been used to heat the tape joining carpet sections together is typically a hand-operated electric iron, usually having a rectangular and substantially flat base. The iron is moved longitudinally along the adhesive tape causing the adhesive to melt, whereupon the sections of carpet are pressed down on the tape.

Two seaming procedures are in common usage. The first, referred to as backseaming, involves inverting the carpet and applying inverted tape to the joint with the application of heat and pressure on the back side of the tape. The second and more popular procedure, known as face seaming, involves working from the face of the carpet with the edges thereof centered over a face-up strip of tape having a ribbon of hot-melted adhesive thereon. The seaming iron is inserted between the upturned edges of the carpet to melt the adhesive, following which the carpet edges are immediately pressed into place to form a permanent bond.

One of the problems which is common when carpet is laid is the occurrence of seam "peaking." A peaked seam is one in which the edges of the carpet at the seam for a ridge. Peaking seams occur primarily on high end, heavyweight carpet with smooth texture. When this tendency is combined with the fact that people who have such carpeting installed are typically more critical than those who buy less expensive, rougher textured carpets, it is quickly apparent that seam peaking is a problem of some importance.

It is commonly thought in the carpet industry that there are several criteria which are normally necessary for this problem to occur. One is too much or too high heat generated by the seaming iron, and the other is such high heat combined with a carpet having a thick, dense pile. The theory goes that the heavy pile forms an efficient layer of insulation above the seam, trapping the heat for several minutes. The theory continues to the effect that the excessive temperature causes the polypropylene primary backing to shrink very slightly, while the latex adhesive and jute secondary backing are unaffected. The theory is that this action causes the edge of the carpet to curl upwardly very slightly, forming the peak, unimpeded by the seaming tapes. When this occurs, no amount of stretching will flatten these seams because the distortion of the backing is permanent.

The fact that the seam peaking problem is very real is evidenced from attempts by carpet manufacturers and seaming iron manufacturers to propose solutions, some of which may help but do not appear to have solved the problem. Economic necessity in recent years has forced installers to handle more square yards of carpet per day. As a result, temperatures used in seaming irons have increased with the need for faster seaming.

One theory for solving the recognized problem is that several steps should be taken. The first is to reduce the seaming iron temperature to a level which will completely melt the adhesive on the tape at a minimum workable rate. A tape which has adhesive thereon which will melt at the lowest possible heat setting on the iron, while allowing a work rate of several feet per minute, is preferable. A scrap of carpet several feet long and slightly wider than the tape, placed face down under the tape will give a firm foundation and prevent the carpet from adhering to the pad. Some installers have used a board or strip of linoleum for this purpose with at least somewhat positive results. Some installers have used a tool box on top of the seam to hold it in place and that, according to one manufacturer, contributes to the problem. Heat and moisture are trapped underneath the tool box, increasing the possibility of seam peaking and color change at the seam. That manufacturer recommends an unweighted three-foot piece of wood 2×4 for this purpose. It provides sufficient weight while allowing heat to escape along the edges. Even better, according to this attempted solution of the peaking problem, is a steel straightedge drilled full of holes to allow heat and moisture to escape. This manufacturer does not state that these steps will solve the problem but states that it should result in fewer customer complaints and reduce the calls to rework while admitting that there may be oher causes of peaked seams and other possible solutions for these causes.

A seaming iron manufacturer has promoted a seaming iron which does the melting job with a lower temperature setting, purportedly to help eliminate seam peaking.

Other suggestions for solving the problem include creating a matching serpentine abutting carpet edge but this was not found to be practical when put into practice. Another attempted solution is to form a grooved sole plate on the seaming iron to guide additional adhesive to the middle between the edges of the carpet, but this did not solve the problem.

Others have used thicker, heavier seaming tape in place of or in addition to placing heat absorbing materials under the seam in order to attempt to counteract the seam peaking problem.

It has been found that when the guidelines for reducing peaking as set out above were followed, the problem may be somewhat reduced but it was not solved. It thus appears that heat within normal ranges is not the source of the problem, except when the seaming iron is substantially too hot. In general, the existence of the problem has been swept under the rug and the proposed solutions are at best stop gap attempts to reduce complaints.

One carpet manufacturer, in an extreme measure to attempt to resolve the peaking problem, has made plans to produce wider carpet to reduce the number of seams necessary. This 13.5 foot wide carpet will definitely reduce the number of seams but it will not prevent them in any room that is more than 13.5 feet in both directions. Also, this size carpeting will be very difficult to handle.

SUMMARY OF THE INVENTION

Careful observations of the carpet seam peaking problem have resulted in new directions for analyzing and solving the problem as disclosed herein. Not all carpet layers work with a seaming iron at too high of a temperature but the peaking problem still exists. A very significant finding was that, in actual practice, peaking did not necessarily result after the seam was created and the heated surfaces had cooled, but occurred after the carpet had been stretched into position on the floor.

Not only does peaking not normally occur until after stretching, the greater the tension put on the carpet, the greater are the chances of peaking occuring or the higher the peak tends to be.

Broadly speaking, according to this invention the solution to the problem of carpet seam peaking is to employ a hot-melt coated seaming tape having a width two to three times that of normal seaming tape, or even wider. Alternatively, three normal width seaming tapes can be used. When applied in a conventional face seaming manner, the problem of peaking is substantially reduced or eliminated.

The invention also concerns several embodiments of extended width seaming irons for use with the extended width seaming tape. One embodiment uses an adapter plate secured to a conventional iron. Another is comprised of two separable halves to facilitate removal at the end of a seam. Still another embodiment comprises an expandable and retractable width iron.

BRIEF DESCRIPTION OF THE DRAWING

The objects, advantages and features of this invention will be more clearly perceived from the following detailed description, taken in conjunction with the accompanying drawing, in which:

FIG. 1 is an exaggerated sectional representation of the problem which this invention solves;

FIG. 2 is a somewhat simplified section through a portion of a typical segment of carpet;

FIG. 3 is another sectional view showing the forces involved in laying, seaming and stretching a carpet, depicting the origin of the seam peaking problem;

FIG. 4 is an exaggerated view of the result of the peaking problem, the source of which was shown in FIG. 3;

FIG. 5 is a cross-sectional representation of the solution to the seam peaking problem of this invention;

FIG. 6 is an enlarged sectional view similar to FIG. 1, showing the solution resulting from employing one embodiment of this invention;

FIG. 7 is a sectional view similar to FIG. 6 showing the solution resulting from employing an alternative embodiment of the invention;

FIGS. 8A–D schematically show different conditions of deformable elements;

FIGS. 9A–D schematically show conditions similar to FIGS. 8A–D with different elements;

FIGS. 10A–C schematically show theoretical conditions of carpet deformation adjacent to a seam;

FIG. 11 shows in exaggerated form the effect of employing the extra width tape of the invention at a seam;

FIG. 12 is one embodiment of an enhanced width carpet seaming iron of the type shown in FIG. 5;

FIG. 13 is a side view of the seaming iron of FIG. 12;

FIG. 14 is an enlarged, partial view of the spring clamp employed to interconnect the adaptor plate and seaming iron of FIG. 12;

DESCRIPTION OF THE PREFERRED EMBODIMENTS

Figure 15:
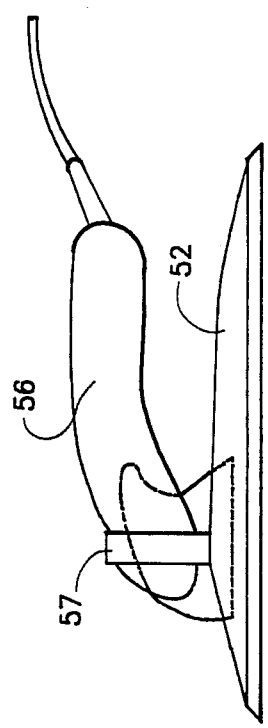
FIG. 15 is a side view of an alternative embodiment of the carpet seaming iron of FIG. 5.

With reference now to the drawing, and more particularly to FIGS. 1 through 4 thereof, the basis for the problem which this invention is designed to correct is portrayed. FIG. 1 is a relatively simple, albeit exaggerated, representation of the seam peaking problem as finally manifested when the carpet laying team has departed. Floor 11 is covered with a conventional resilient pad 12 and carpet sections 13 and 14 are laid on top thereof. The problem to which this invention is addressed is represented by seam 15 which, in this figure, has raised from the pad, resulting in a peak along the length of the seam and a V-shaped gap between the carpet tufts. As stated previously, this peaking problem only occurs after the carpet has been laid. Seaming tape 16, normally about three inches (7.62 cm) wide, has been applied to secure the two carpet elements together at the seam and the carpet has been stretched and secured at the edges of the room. It is this peaking problem and the solution thereto to which this invention is addressed. The construction of seaming tape normally includes glass fibers so it is very resistant to stretching.

A detail of the typical carpet construction is shown in FIG. 2. The loops or carpet tufts 21 pass through primary backing 22 and are secured thereto by a latex tuft binding material 23. Finally, secondary backing 24 is placed over the latex binding and the bight portion of the U-shaped tufted elements as shown in the drawing.

The primary backing is normally a synthetic fabric made in a fine or dense weave to facilitate the insertion of the tufting material. The secondary backing is a natural material, normally jute or a different weave (less dense) of the primary backing material. One of the sources of the peaking problem is that the primary and secondary backings have different stretching characteristics.

When the stretching forces are applied to the carpet as shown in FIG. 3, there is an unequal stretching in that the secondary backing tends to stretch more easily. The carpet is anchored at one side of the room and a stretching tool or machine is applied to the edge of the carpet adjacent the other side of the room. The carpet is forcefully stretched toward that wall in the direction of arrow 25. The force or load line 26 is shown centered, parallel to stretching force line 25. As would normally be expected, the forces are distributed through the thickness of the carpet so that the resulting load line would be near the center. However, from FIGS. 3 and 4 it can be seen that the only connection between the load line in carpet section 27 and carpet section 28 is through seaming tape 31. Therefore, the load line will have to divert from its straight or parallel direction and pass through seaming tape 31. This means that the secondary backing is secured at either floor extremity and the only connection between carpet sections is made to the secondary backing. Since the stretch load distributed throughout the carpet from one wall to the other would want to remain parallel, the seam would have to rise as shown in FIG. 4 so that the load line can become as straight as possible. This could easily be demonstrated by folding a piece of paper and then pulling away from the fold on either end. The downward pointing peak of the fold would tend to rise to become as straight as possible. The phenomenon described above is referred to herein as load realignment.

The effect shown in FIG. 4 is contributed to by the fact that the secondary backing tends to stretch more easily than the primary backing. This condition may be referred to as snap-back. The extra stiffness of the primary backing tends to cause an internal tension in each section of the carpet which, because the secondary backing stretches more easily, would tend to cause an upward curl after the seam is formed and the carpet has been stretched. The only reason that the upward curl cannot mature into full bloom is because the ends are secured either to the tack strips at the periphery of the room or to another piece of carpet at the seam by means of the seaming tape. Thus, there are two contributing but related factors which tend to cause and exacerbate the peaking problem as shown in FIG. 1.

The problem is solved, or at the very least, substantially reduced, by the method and apparatus shown in FIGS. 5-7. Seaming tape 35 shown here is between two and three times the width of the conventional seaming tape shown in FIGS. 3 and 4. Thus, a greater portion of the secondary backing of carpet sections 36 and 37 are secured to the seaming tape. The seaming iron, or sadiron, employed for applying this tape to form the desired seam is represented by reference numeral 38. It can have a number of embodiments as will be discussed later herein. It has been found that by increasing the width of seaming tape and consequently increasing the proportion of the secondary backing which is secured by the tape at the seams, the peaking problem is eliminated or substantially reduced. It is important to note that at the seam, only the bottom or secondary backing is subject to stretching forces, and these stretching forces are, of course, transmitted from the secondary backing through the adhesive to the seaming tape and back through the adhesive to the secondary backing on the adjacent section of carpet.

The following is a simplified explanation of the snap-back and load realignment phenomena and how their effect in creating the carpet seam peaking problem is greatly reduced by the practice of the present invention. There are two basic reasons why peaking is no longer visible when the teachings of this invention are employed. The first is that the snap-back condition is substantially reduced. Secondly, although the load realignment phenomenon is not eliminated, it is removed far enough from the seam so that the effects of snap-back and load realignment are independent and not additive. The result is that seam peaking is greatly diminished, to the point of being insignificant under nearly all circumstances.

The basic reason that the carpet at the seam does not snap back as much when the increased width tape is employed is that the tape, normally including glass fibers which are resistant to deformation, functions as reinforcement for the bottom layer of the carpet. This results in the creation of an area of the carpet where snap-back is reduced because there is less relative motin between the primary and secondary backings.

For simplification purposes, analogies will be used in the following word pictures and drawing figures. Reference will be made to FIGS. 8-11 in explaining the theory of carpet seam peaking and its solution by means of this invention.

Assume the top and bottom backing of the carpet are rubber bands 111 and 112 respectively, with no latex binding material between them. They are shown in FIG. 8A as having substantially the same elasticity, in unstretched condition. Then, assuming they are subject to equal stretching forces represented by arrows 113A and 113B, they are deformed equally as shown in FIG. 8B. These rubber bands represent the top and bottom carpet backing layers. If the top rubber band, or top carpet backing, is released, it snaps back to its original position, as represented by FIG. 8C. Now assume that a substance such as latex core 114 is inserted between the bands 111 and 112 before the top one is released, FIG. 8D shows that when band 111 is released, it does not return all the way back to its original position. The latex core presents a shear resistance to top layer 111 snapping all the way back. As employed here, shear resistance is the amount of resistance that exists to relative movement between the top and bottom bands 111 and 112, or between the top and bottom carpet backings.

The conditions are changed somewhat in FIGS. 9A-D. Band 118 is the same as band 111, but bottom band 115 is much stiffer or resistant to deformation, preferably about an order of magnitude stiffer. This represents the difference between the top carpet backing, typically polypropylene, and the glass fiber based seaming tape. Thus these bands represent the top carpet backing and a bottom backing equivalent to seaming tape in stiffness, or resistance to strain. If forces 116 and 117 are applied to bands 118 and 115 in order to achieve the same deformation, force 117 would be greater, by nine to ten times for example, than force 116. This would result in a total stretch of about 25% of that of FIG. 8B for the same total force applied. As in FIG. 8C, release of band 118 in FIG. 9C allows it to snap back to its original position. But it would only snap back about one-fourth as far as before because it was not stretched as far. Like FIG. 8D, FIG. 9D shows that latex core 121 adds shear resistance to prevent band 118 from snapping back even that far, so that force 116A is distributed through the latex core. Thus band 118 might snap back only about one-eighth as far as did band 111 in FIG. 8C.

Now the theoretical aspects will be carried farther in FIGS. 10A-C. Assume right hand end 122 of a carpet segment is one side of a seam. The carpet segment is formed of backing or band 118 on top and backing 115 on the bottom, with latex 121 therebetween, equivalent to FIG. 9D. Immediately to the left is another segment of carpet comprised of bands 111 and 112, with latex 114 between them, equivalent to FIG. 8D. These are contiguous elements and are shown separated for illustration only, to provide examples of how different carpet segments would behave if they were isolated. This indicates that if the two segments were butted and secured, the top portions would not meet. However, reality is that they do meet and FIG. 10B depicts that condition. Because of the resilience or shear force of contiguous latex layer 123, top 111 tends to be pulled to the right and top 118 tends to be pulled to the left and the adjacent ends would meet at a location intermediate their respective positions in FIG. 10A. At what specific intermediate position is a function of the amount of shear resistance produced by pulling top 118 to the left. How much relative motion there is at seam end 122 is a function of how much latex 123 there is between the two layers or backings. That is one reason why peaking is more of a problem with thicker carpets. Because of this snap-back adjacent the seam, where backing 118 is not secured at right-end 124, it is easily seen how an upward curl would result at the seam. Top layer 118, through latex core 123, is pulling up on the right end 122 of bottom layer 115, which is actually the only connection across the seam, indicated by force arrow 125.

An increase in latex thickness results in reduced shear resistance, while the length of band 115 (width of seaming tape) increases shear resistance. The longer band 115, the more shear force that can safely be generated with the top layer without causing peaking. If band 115 is thought of as reinforcement to the carpet secondary backing, a difference in that reinforcement width by a factor of two results in twice the shear resistance and about half the amount of peaking caused by snap-back. An example is shown in FIG. 10C with reinforcing area 126 twice as wide as layer 115. A positive result, because of increased shear resistance between bottom backing 126 and top backing 127, is that right hand end 131 of backing 127 is only half as far from seam end 122 as it was in FIG. 10B, so that snap-back peaking is only half of what it would have been in FIG. 10B. Force arrow 132 represents the fact the stretching forces on the carpet are connected across the seam at the bottom.

Finally, load realignment is represented in FIG. 11. Wide carpet seaming tape 133 extends across the seam and force arrow 134 represents the fact that the stretching forces cross the seam only through the tape. This results in an actual lifting of the carpet in the vicinity of the seam (see FIGS. 6 and 7) so that the load line can be as straight as possible. To reiterate, the forces 134B and 135B at the wall are substantially equal, making resultant load line 136 centered in the left portion. That load line tries to stay horizontal through seaming tape 133 at the seam, causing the lifting force to result. When that lifting force is removed a reasonable distance from the seam, its effect on the seam itself is substantially nullified. Conversely, the narrower the seaming tape, typically about 1.5 inches (38.1 mm) on either side of the seam, the closer is the load realignment to the seam. When the lifting force and the seam line up, the load realignment effect and the snap-back effect reinforce each other. Even without snap-back, load realignment near the seam would tend to create a peaking problem.

To summarize this analysis of the problem and the solution, FIG. 1 shows the problem of snap-back and load realignment combining to accentuate these two carpet peaking causes. The solution to both causes of the peaking problem is the enhanced width tape shown in FIGS. 5-7. The seam in FIG. 6 shows little or no peaking because of reduced snap-back, and relocation of the load realignment to a place far enough removed from the center of the seam to ensure that it does not combine with the snap-back effect. The ideal width of the seaming tape to achieve the desired results ranges from about one and one-half normal width to several times that width. In theory, the wider the better, but cost and handling ease limit the practical width to about six inches. The minimum width of the tape to achieve satisfactory improvement of seams depends on several factors, including thickness of the latex core, as mentioned above. Thus, each carpet has its own ideal tape width, but it should be substantially wider than what has heretofore been normal.

Experimentation has shown that three conventional width seaming tapes in parallel, with one of them (39) being in the normal position centered at the seam and the other two (40, 41) flanking the central tape, can also substantially reduce seam peaking. Interestingly enough, this is true even if the flanking tapes are not secured directly to the center tape, as shown in FIG. 7. The reduction of the stretching allowed in the secondary backing is just as true of this alternative configuration. In either case, the linear, lateral proportion of the secondary backing which is allowed its normal stretching characteristics is reduced by either of these embodiments because the seaming tape stretches substantially less than does the secondary backing of the carpet. By being substantially rigid, the tendency of the secondary backing to stretch more easily, causing the two joined carpet pieces to curl upwardly as discussed above, is greatly reduced.

Sadiron 38 in FIG. 5 is a schematic representation of a possible device for heating the hot-melt adhesive on the top of the enhanced width seaming tape. Several specific embodiments of such an iron are disclosed. An adapter plate for a conventional sadiron is shown in FIGS. 12-14. The heat conducting sole plate 46 is formed with a dovetail groove 42 which is adapted to closely engage the tapered edges of sadiron 43. Because sole plate 46 is highly heat conductive, the heat generated by sadiron 43 is adequate to provide sufficient heat on bottom surface 44 of the sole plate to melt the adhesive on the seaming tape. Adapter plate 46 and sadiron 43 are formed with a mating coupling to releasably secure them together. The particular coupling contemplated is a spring clamp 45, as shown in FIGS. 13 and 14. The clamp is mounted to adapter plate 46 and engages a mating access opening in sadiron 43. By pressing down on the spring clamp the two elements can be disengaged.

Figure 16:
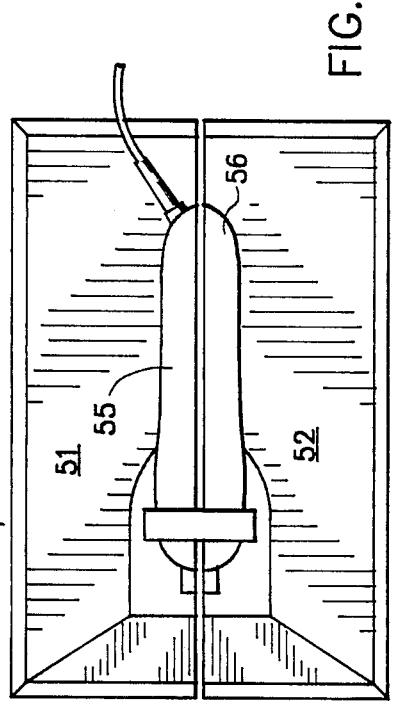
FIG. 16 is a top view of the carpet seaming iron of FIG. 15.
Figure 17:
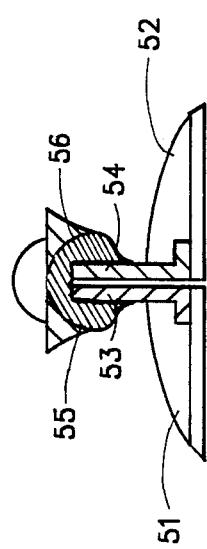
FIG. 17 is an end view of the iron of FIG. 15.

Another embodiment of the carpet seaming iron is shown in FIGS. 15-17. Because the iron is quite wide, there may be reasons why it would be desirable to form it in separable pieces. Thus, this embodiment is formed of right and left side elements 51 and 52, respectively. Each of these sadiron sides has confronting upwardly extending tabs 53 and 54 to which are connected respective handle halves 55 and 56. A removable slide clamp 57 engages the handle halves to hold the two sections of the sadiron together during normal seaming operations. Because this iron is quite wide in order to accommodate the extra width tape of this invention, under certain circumstances it is desirable to separate the two sections of the iron to facilitate removal of the iron from close work areas at the end of a seam. This can easily be done by simply slipping off the slide clamp and then lifting out one iron section at a time. It is also easier to handle and transport in the form of two smaller segments.

A convertible carpet seaming iron is shown in FIGS. 18-21. In the closed or retracted condition of FIG. 21 sadiron 61 has a conventional width and can be used with the normal width seaming tape. When in the open or extended condition of FIG. 20, the sole plate of sadiron 61 has a width two to three times that of the normal width iron. A lever and parallelogram arrangement is employed, together with telescoping guide members, to permit smooth operation of this sadiron between the extended and retracted conditions.

Figure 18:
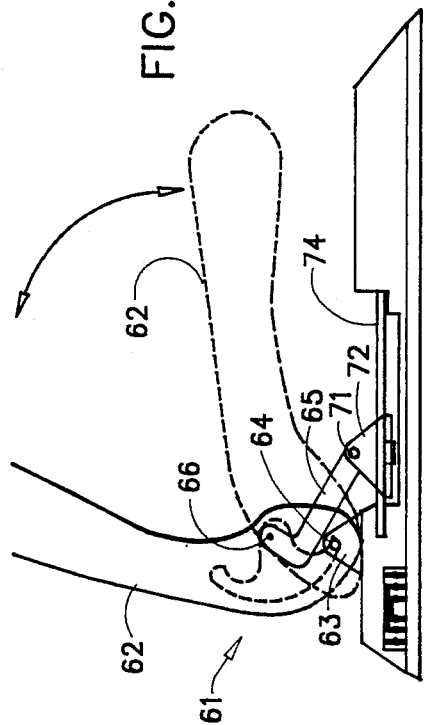
FIG. 18 is a side view of another alternative embodiment of the carpet seaming iron of FIG. 5.
Figure 19:
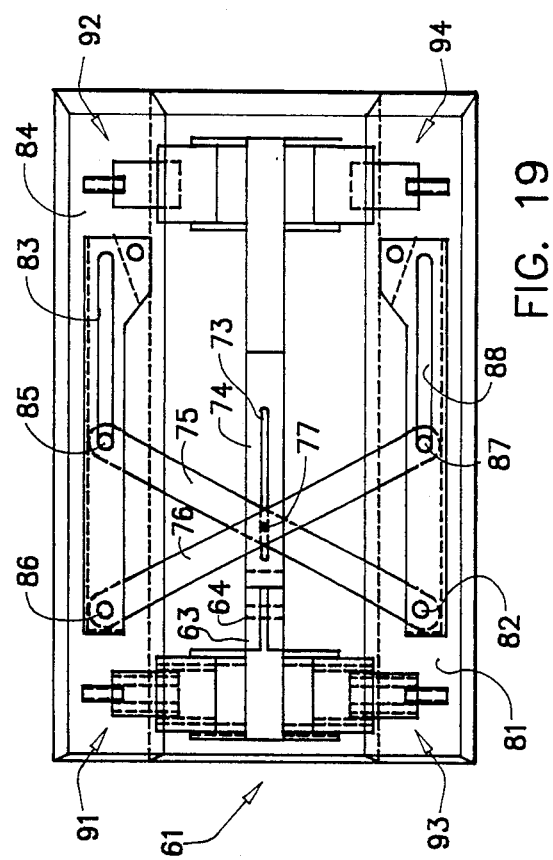
FIG. 19 is a top view of the iron of FIG. 18.

As shown in FIGS. 18 and 19, handle 62 is pivoted at mounting element 63 by means of interconnecting pin 64. Lever arm 65 is pivoted to arm 62 by means of pin 66, the other end of which is pivoted by means of pin 71 to boss 72 adapted to slide in slot 73 of bridging member 74. Boss 72 is pivotably connected to parallelogram arms 75 and 76 by means of pin 77. One end of arm 75 is pivotably connected to left retractable sole plate member 81 by means of pin 82 and the other end is slidably engaged in slot 83 on right sole plate member 84 by means of pin 85. Similarly, parallelogram arm 76 is pivotably connected to right sole plate member 84 by means of pin 86 and opposite end pin 87 slidingly engages slot 88 in sole plate member 81. Simple, telescoping guide members 91, 92, 93 and 94 ensure the parallel operation of the retractable sole plates when being moved between the retracted and extended positions.

Figure 20:
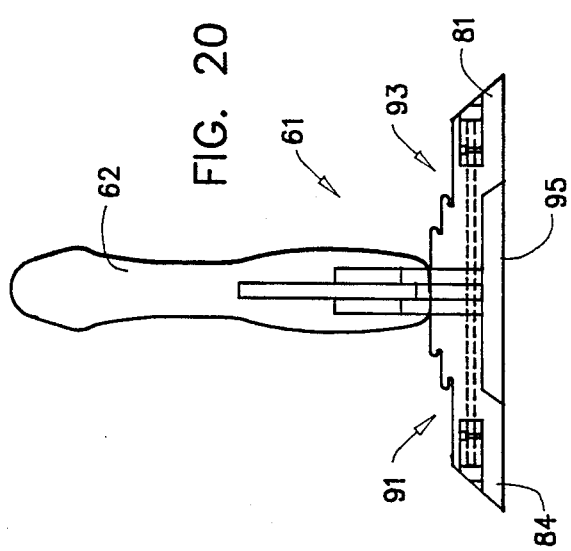
FIG. 20 is an end view of the carpet seaming tool of FIG. 18 in open or expanded position.
Figure 21:
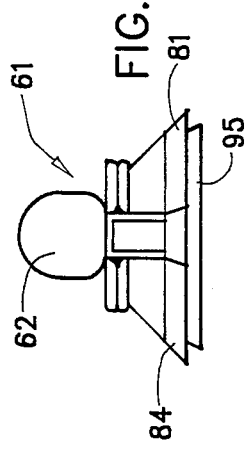
FIG. 21 is an end view similar to FIG. 20 showing the iron in closed or contracted position.

In operation, FIGS. 18, 19 and 20 show the carpet seaming iron in the extended condition with handle 62 in its most forward position. Sliding boss 72 and sliding pins 85 and 87 are at the forward end of their permitted travel and the telescoping members are fully extended so that the sadiron is in the extended condition shown in FIG. 20. Thus, the sole plate is a combination of center sole plate 95 and side sole plates 81 and 84 to provide the necessary width to heat the extended width tape of FIG. 5. When it is desired to employ the sadiron of this embodiment for a normal width seaming tape or to facilitate removal of the sadiron at the end of a seam when the heating operation has been completed, handle 62 may be lowered to the retracted position shown as a dotted alternative in FIG. 18 and to achieve the configuration shown in FIG. 21.

All three of these sole plate members have heating elements therein. They may be operated by a single switch so that they are all heated at the same time or a switch may be operated in conjunction with the movement of handle 62 so that the left and right sole plates have power applied to their heating elements when in the extended position of FIG. 19. The switch may be opened to remove the power to the heating elements when in the retracted position of FIG. 21.

In view of the above description, it is likely that improvements and modifications will occur to those skilled in the art which are within the scope of the appended claims.

What is claimed is:

1. A method for laying multiple layer, tufted carpet to substantially reduce seam peaking which tends to occur in such carpeting after abutting edges of the carpet are secured together by means of hot-melt adhesive coated seaming tape normally having a width of approximately three inches and wherein the carpet is subsequently finally stretched, said method resulting in a substantially flat carpet seam and comprising the steps of:

cutting and fitting the carpet to the floor area with abutting edges of adjacent carpet sections forming seams;

applying normal width, hot-melt adhesive coated, flanking seaming tape to the backing of each section of carpet on either side of each said seam and spaced from each respective carpet section edge by approximately one-half the width of said seaming tape;

heating said flanking seaming tapes to secure said tapes to the respective carpet section backing;

laying a third normal width hot-melt adhesive coated seaming tape beneath each said carpet seam and underlying the carpet sections substantially equally on either side of said seam;

heating said third seaming tape with a carpet seaming iron;

forcing the adjacent carpet edges down onto the molten adhesive side of said third seaming tape; and then stretching the carpet to the floor periphery.

2. The method recited in claim 1, wherein the composite width of said three tape elements is approximately 9 inches.

* * * * *